May 25, 1954     J. R. TURNER     2,679,311
ARTICLE ORIENTING DEVICE

Filed March 16, 1951     4 Sheets-Sheet 1

INVENTORS
JOHN R. TURNER
BY
John H. Lewis Jr.
ATTORNEYS

May 25, 1954

J. R. TURNER 2,679,311

ARTICLE ORIENTING DEVICE

Filed March 16, 1951

INVENTORS
JOHN R. TURNER
BY
John H. Lewis Jr
ATTORNEYS

May 25, 1954  J. R. TURNER  2,679,311
ARTICLE ORIENTING DEVICE
Filed March 16, 1951  4 Sheets-Sheet 3
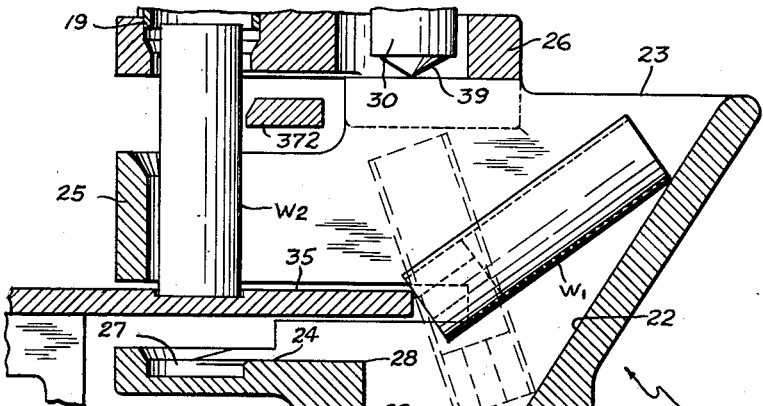
Fig. 4
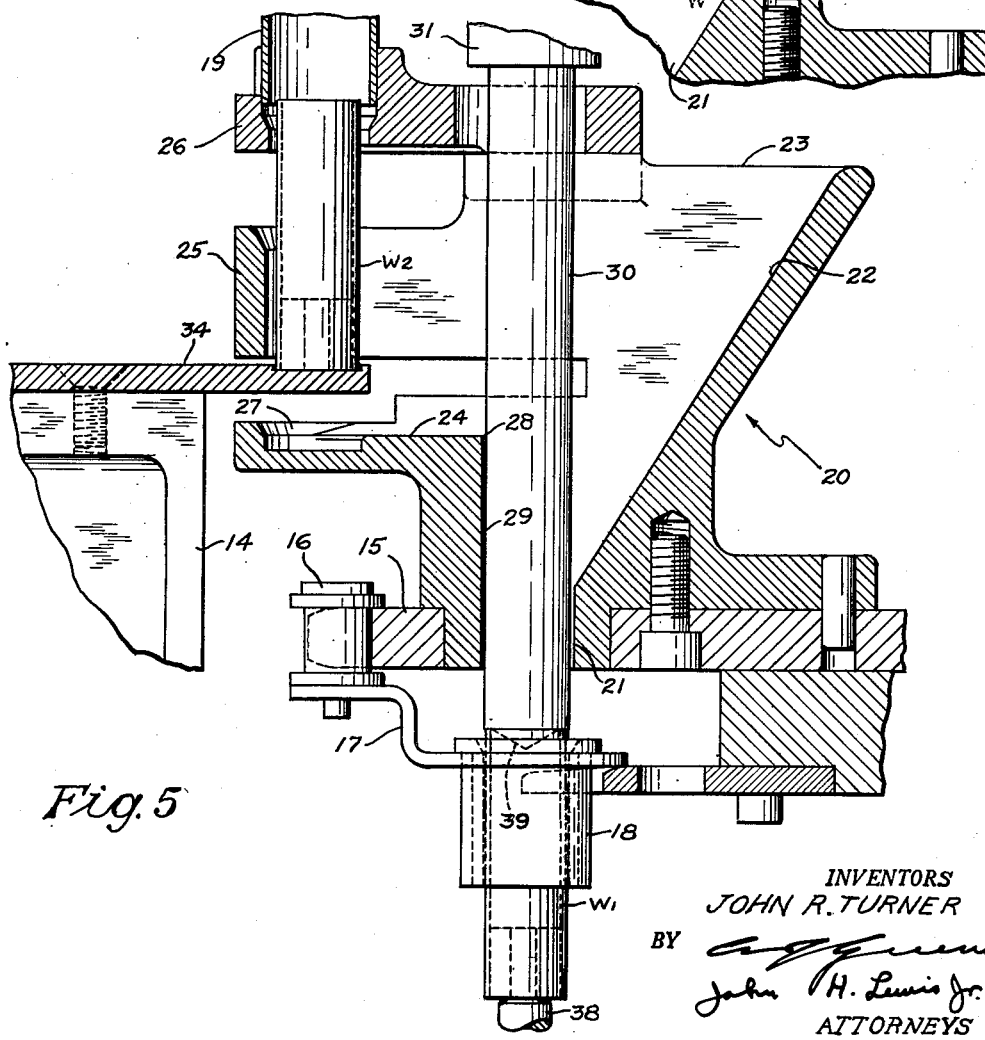
Fig. 5
INVENTORS
JOHN R. TURNER
BY
ATTORNEYS Patented May 25, 1954

2,679,311

UNITED STATES PATENT OFFICE 2,679,311

ARTICLE ORIENTING DEVICE

John R. Turner, Glen Mills, Pa., assignor to Remington Arms Company, Inc., Bridgeport, Conn., a corporation of Delaware Application March 16, 1951, Serial No. 216,040

7 Claims. (Cl. 198—33)

This invention relates to apparatus for arranging articles in a predetermined position of orientation and successively delivering correctly oriented articles to transfer devices, such as receptacles associated with a conveyor chain.

The particular embodiment of the invention to be described is designed for the orientation and delivery of somewhat elongated tubular articles having a weighted end—specifically, sections of wound paper tubing each carrying adjacent one end a base wad blank.

Figure 2:
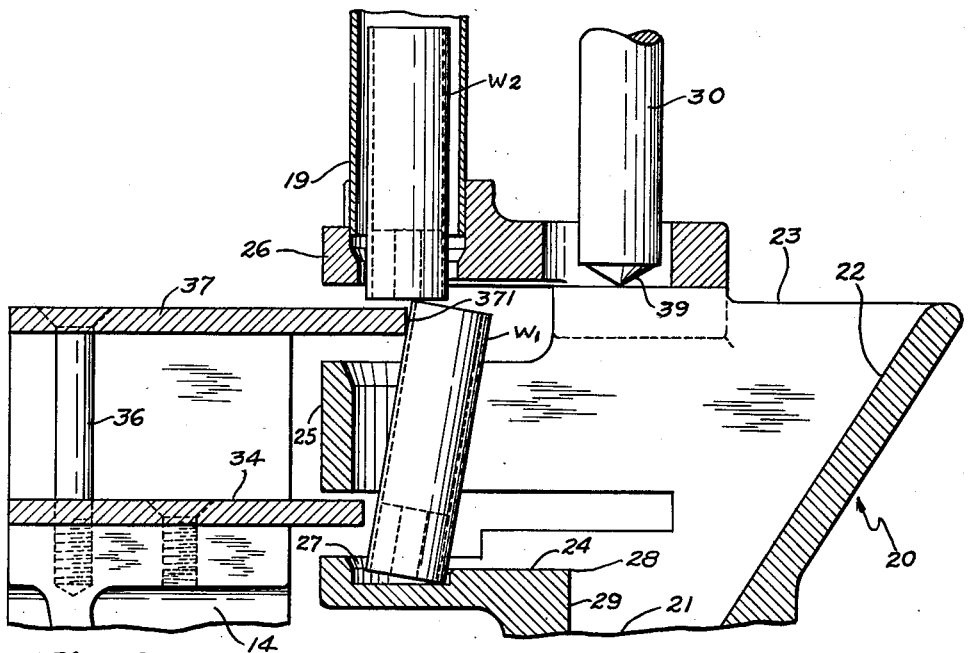
Fig. 2 is a sectional elevation of an orienting cell and associated parts, showing a workpiece being displaced by the turn-over cam. The section is substantially on the line 2—2 of Fig. 6.

Fig. 4 is a section, similar to Fig. 2, showing the alternative positions of each workpiece as displaced by the pusher cam according to the position in which it is presented to such cam. The incoming supply of workpieces is supported in a guide groove in the pusher cam. The section is substantially on the line 4—4 of Fig. 6.

Fig. 5 is a section, generally similar to Fig. 2, showing the final positioning of a workpiece in a conveyor chain bushing, the incoming supply of workpieces being supported in a circular groove in a guide plate which lies in the same plane as the pusher cam. The section is substantially on the line 5—5 of Fig. 6.

Figure 1:
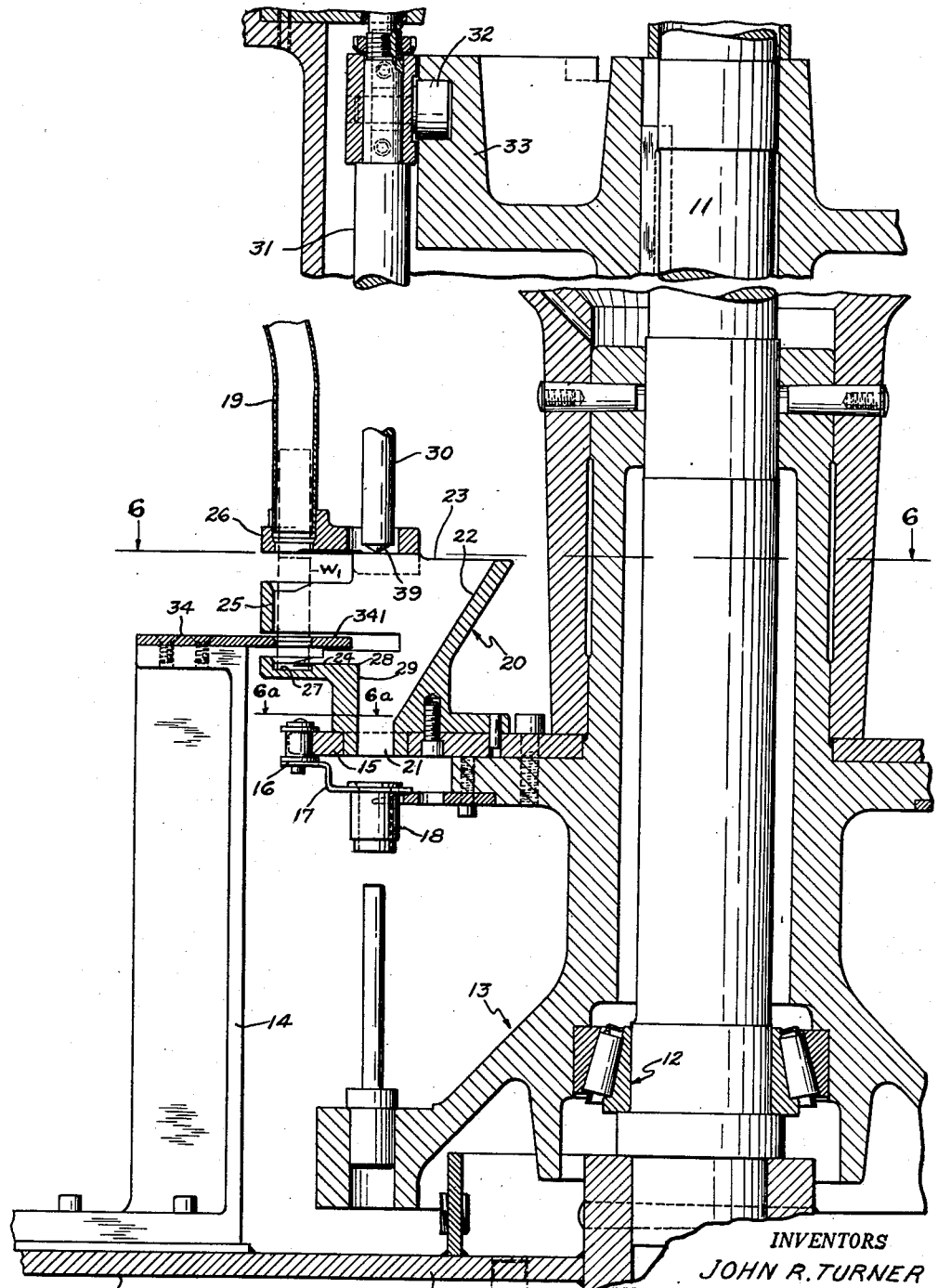
Fig. 1 is a fragmentary sectional elevation of a machine comprising one embodiment of the invention. The section is substantially on the line 1—1 of Fig. 6.
Figure 6:
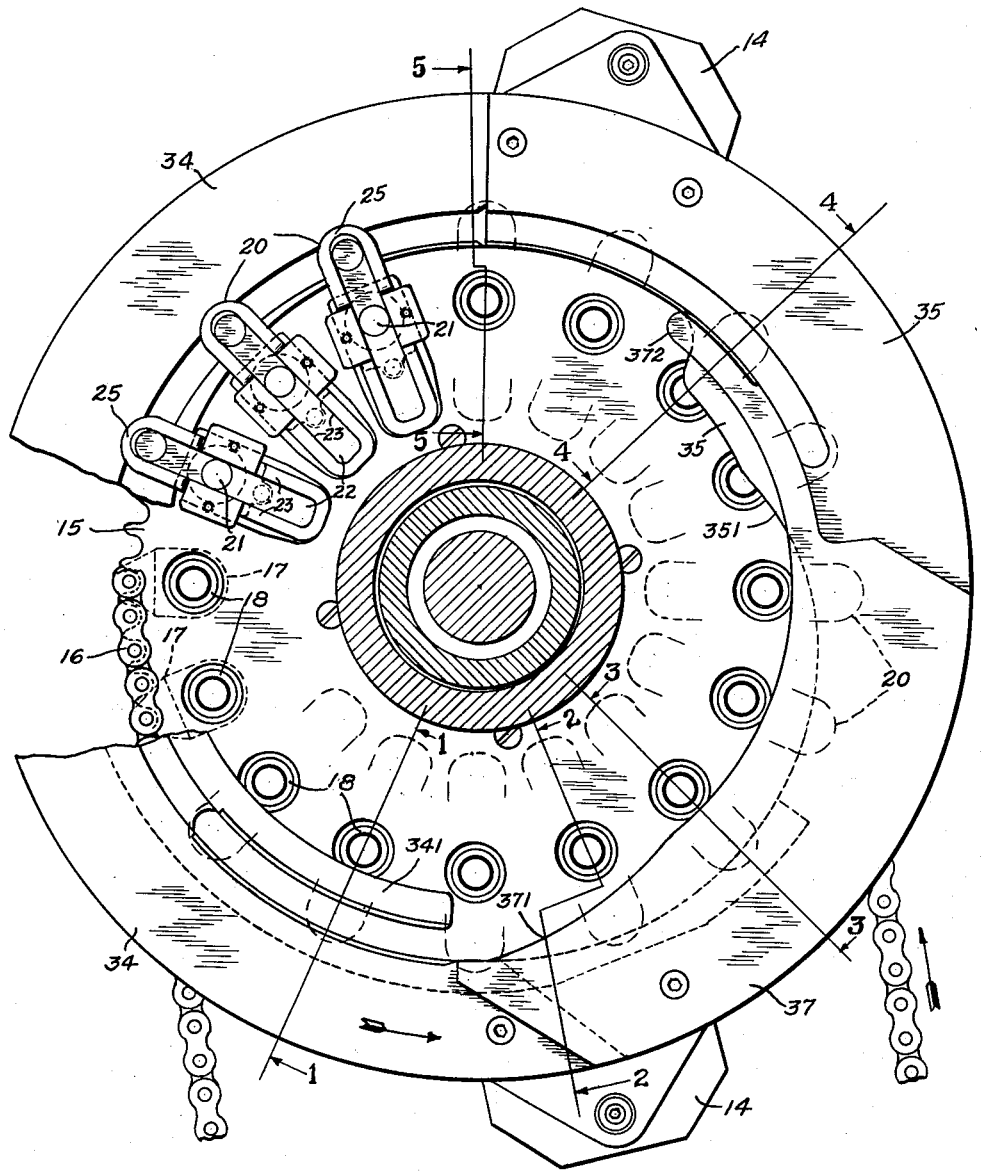

Fig. 6 is a sectional plan view essentially on the line 6—6 of Fig. 1. Only a few of the numerous orienting cells are shown, and a portion of the guide ring has been broken away to show the conveyor chain and associated parts, this section being substantially on the line 6A—6A of Fig. 1.

The machine of the present invention as illustrated is designed to function as one unit of a composite machine for the complete assembly of shot shell bodies. The machine as a whole comprises a plurality of turret-like stations at which a succession of operations are performed on workpieces which are transferred from one turret to another by means of a continuously moving conveyor chain arranged to successively traverse sprockets associated with the turrets respectively and usually supplying the means for driving the turrets.

The purpose of the present unit is to receive wadded shot shell bodies and to deliver such bodies in turn in wadded-end-down position to receptacles carried by the conveyor chain by which wadded bodies are transferred to succeeding units for further processing.

The unit comprises a fixed base 10 and, upstanding therefrom, a fixed pedestal 11 having associated therewith suitable bearing members, one of which is illustrated at 12, affording supports for the revolving turret identified generally by numeral 13. It should be borne in mind that the only fixed parts illustrated in the drawing are the pedestal 11, the base 10, post 14 and certain other cams and guides to be described. All other parts are, in addition to such other movements as they may have, in constant rotary motion about the center of pedestal 11.

Secured to turret 13 is a sprocket wheel 15 adapted to be traversed by a sprocket chain 16 having secured thereto at regular intervals arms 17 terminating in apertures adapted to receive workpiece holding bushings 18. Chain 16 is driven from an external source and furnishes the motive power for turret 13. Workpieces, such as wadded shot shell bodies, are received through a plurality of tubular members 19 from an overhead hopper. A suitable hopper with means for delivering workpieces therefrom into tubular members such as 19 is illustrated and described in the patent to Reynolds, No. 2,538,706, January 16, 1951.

The means for supplying workpieces to tubes 19 is such that workpieces therein may be either end up, and it is essential that they be arranged wadded-end-down and so delivered to the bushings 18. For this purpose, the present invention contemplates a plurality of orienting cells identified generally by the numeral 20, there being one such cell associated with each of the tubes 19. Said orienting cells are, for convenience, secured to sprocket wheel 15, and each cell is provided with an outlet aperture or throat 21 through which each workpiece in turn moves directly into one of the bushings 18 carried by sprocket chain 16. Each cell comprises a sloping back wall 22 which merges with parallel side walls 23 spaced by a distance slightly greater than the transverse dimension of the workpiece, a floor portion 24 affording a temporary support for a workpiece in horizontal position, and a front wall 25. The front and side walls are slotted through to receive a fixed pusher cam and guide ring, to be described. To the upper portion of each cell is secured a supporting block 26 which receives the lower end of a tube 19 and is apertured to hold this tube in substantially vertical alignment with a circular recess 27 in the floor 24. The floor 24 terminates in an arcuate shoulder 28 at the top of a semi-cylindrical wall 29 which is an extension of a portion of the margin of the exit aperture 21.

Figure 3:
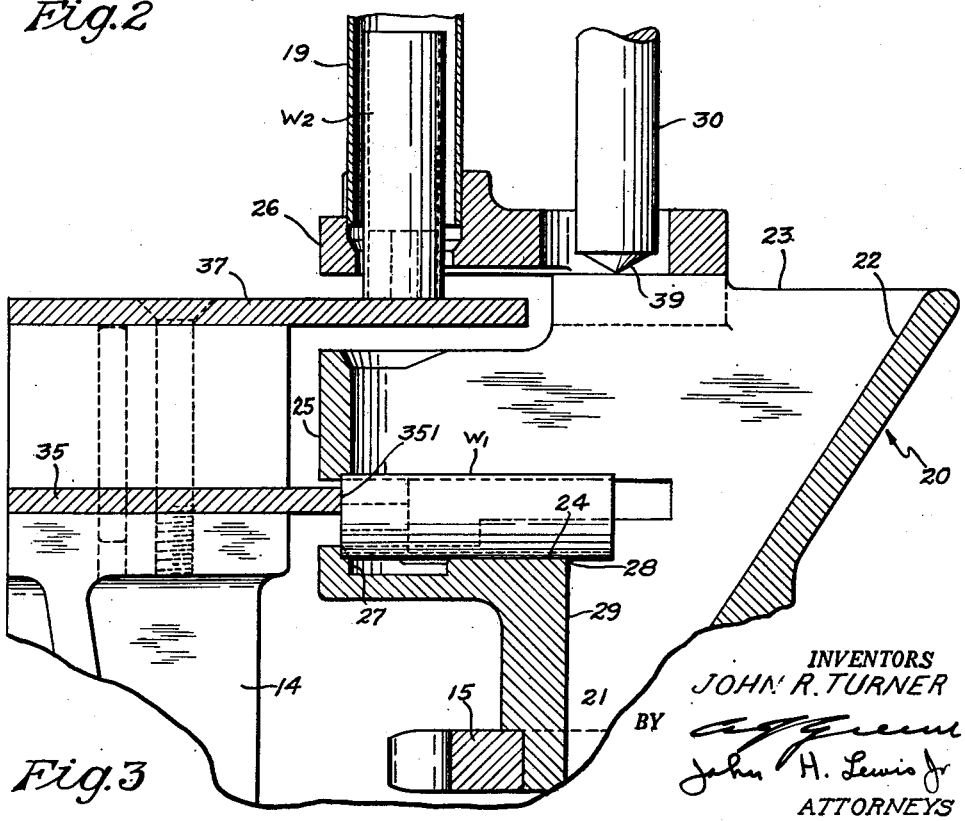
Fig. 3 is a section, similar to Fig. 2, showing the workpiece in horizontal position and about to be displaced by the pusher cam, the incoming supply of workpieces being supported upon the upper face of the turn-over cam. The section is substantially on the line 3—3 of Fig. 6.

Block 26 is apertured to pass an ejector stem 30 carried by a holder 31 which is vertically reciprocated by cam follower 32 engaging cam 33 which is fixed to pedestal 11. Secured to the upper ends of the aforementioned posts 14 are a guide ring 34 and a pusher cam 35. The upper surfaces of members 34—35 lie in the same plane and both afford a support and guide surface for partially controlling the movement of workpieces W as delivered from tube 19—both project into the aforementioned slots in the outer portions of the orienting cells. Secured on posts 36 extending upwardly from the pusher cam 35 is a turn-over cam 37, which cam likewise operates on incoming workpieces. The movement of a workpiece from a tube 19 into a chain bushing 18 is as follows:

Consider first the position of the parts illustrated in Fig. 1, corresponding to section line 1—1 of Fig. 6. The ejector stem 30 is in elevated position and remains in elevated position throughout the sequence illustrated in Figs. 1 to 4, inclusive. The lowermost workpiece $W_1$ has cleared the tube 19 and stands in vertical position directly below said tube in the recess 27 of floor 24, supporting the column of workpieces above it in tube 19. Maintenance of vertical position is aided by a guide arm 341 integral with guide ring 34. Said guide ring, like pusher cam 35 and turnover cam 37, is fixed, and the succession of delivery tubes and other parts carried by the turret are moving in the direction of the arrow, Fig. 6. As the cell containing a workpiece $W_1$ in the Fig. 1 position approaches the Fig. 2 position, said workpiece is laterally engaged adjacent its upper end by the active face 371 of turn-over cam 37, and is pushed from beneath the following workpiece $W_2$ in tube 19, as shown in Fig. 2. At the same time, said workpiece $W_2$ moves over the cam 37 and comes to be supported thereon as the workpiece W is completely overturned by cam face 371 and comes to rest in a horizontal position on the floor 24 of cell 20, as illustrated in Fig. 3. In the continued movement of the cell and the workpiece therein, the workpiece is moved radially inward within the cell by engagement with the active face 351 of pusher cam 35— the innermost position of said cam 35 within the cell 20 being illustrated in Fig. 4.

The behavior of the workpiece at this time depends on the location of the heavy end of the workpiece when in its Fig. 3 position. If the heavy end is outward, the center of garvity is still above the floor 24 at the time the forward or inner end of the workpiece engages the sloping inner wall 22 of the cell and, due to the slope of this wall, the forward end of the workpiece rides up the wall, the workpiece assuming the position shown in full lines in Fig. 4. As such workpiece passes the high part of cam 35 it falls heavy-end-downward into the exit throat 21. If, when in the Fig. 3 position, the heavy end of the workpiece is forward, the light end being engaged by cam 35, as the cam pushes the piece forward its center of gravity passes the shoulder 28 before its forward end has engaged the wall 22, and the workpiece again falls heavy-end-downward, initially pivoting about shoulder 28 and in transit assuming generally such a position as is illustrated in dotted lines in Fig. 4. Thus, all workpieces are delivered heavy-end-down, regardless of their positioning in tube 19. As shown in Fig. 4, the following workpiece $W_2$ has passed from the end of turn-over cam 37 and descended until it rests in a guide groove in cam plate 35, being guided in its descent by an extending finger 372 of cam 37. Said guide groove in pusher cam 35 is in alignment with a similar groove in guide ring 34, which for this purpose is an extension of cam 35. Thus, the position of a workpiece $W_2$ with respect to a cell 20 remains essentially the same as the turret rotates from the Fig. 4 position to the Fig. 1 position. However, in this interval, the stem 30 descends, to insure the escape of the workpiece through the throat 21 and into the aligned chain bushing 18. In alignment with the throat 21 of each cell is a support, such as a post 38, upon which the workpiece comes to rest while embraced by bushing 18. The stem 30 is preferably provided with a conical point 39 having the function of slightly expanding the mouth of the shell to facilitate further work thereon. It will be remembered that in the illustrative machine the workpieces are tubes of paper or the like having inserted in and closely adjacent one end thereof a wound paper blank. Such workpieces wadded-end-down are supported on the post 38 by the blank insert. In the absence of an insert, or in the event that a tube is delivered upside-down, such tube will fall over a post 38, instead of being retained thereby in the bushing 18. The delivery of incomplete or improperly positioned workpieces is thus prevented.

It will be understood that the embodiment of the invention illustrated and described is merely illustrative, and that the invention and various elements thereof are susceptible to a variety of modifications.

What is claimed is:

1. Apparatus for delivering elongated gravitationally asymmetric workpieces to receptacles on a continuously moving conveyor in a predetermined orientation, said apparatus comprising a turret traversed by said conveyor, a workpiece holding tube on said turret, a radially elongated orienting cell on said turret comprising an exit aperture in alignment with a conveyor receptacle traversing said turret, means for delivering workpieces one at a time from said tube to said cell, and fixed means for moving workpieces radially endwise through said cell toward said exit aperture, the configuration of said cell being such as to present each workpiece to said exit aperture in the predetermined orientation.

2. Apparatus for delivering elongated gravitationally asymmetric workpieces to receptacles on a continuously moving conveyor in a predetermined orientation, said apparatus comprising a turret traversed by said conveyor; a workpiece holding tube on said turret; an orienting cell on said turret comprising an exit aperture in alignment with a conveyor receptacle traversing said turret; means for delivering workpieces one at a time from said tube to said cell; and means for moving workpieces endwise through said cell toward said exit aperture, said cell comprising a shoulder adjacent said exit aperture adapted to form an axis of rotation for workpieces in one orientation, and a sloping wall adapted to form a guide for workpieces in another orientation, a workpiece in the second orientation being thrust upwardly along said guide by said workpiece moving means.

3. Apparatus for delivering elongated gravitationally asymmetric workpieces to receptacles on a continuously moving conveyor in a predetermined orientation, said apparatus comprising a turret traversed by said conveyor, a workpiece holding tube on said turret, a fixed member traversed by said tube and adapted to temporarily support articles therein, an orienting cell on said turret comprising an exit aperture in alignment with a conveyor receptacle traversing said turret, a cam on said fixed member adapted to displace workpieces aligned with said tube into said cell, and means for moving workpieces endwise through said cell toward said exit aperture, the configuration of said cell being such as to present each workpiece to said exit aperture in the predetermined orientation.

4. Apparatus for delivering elongated gravitationally asymmetric workpieces to receptacles on a continuously moving conveyor in a predetermined orientation, said apparatus comprising a turret traversed by said conveyor, a workpiece holding tube on said turret adapted to hold a column of workpieces in vertical end-to-end relation, means for temporarily supporting the lowermost workpiece in said tube comprising a fixed member adapted to be traversed by said tube, means for subsequently supporting the lowermost work piece in alignment with said tube comprising a second fixed member, an orienting cell on said turret comprising an exit aperture in alignment with a conveyor receptacle traversing said turret and adapted to receive said workpieces in a vertical position when released by said second fixed member, a cam surface on said first fixed member adapted to turn said workpiece from a vertical position to a horizontal position, and a cam surface on said second fixed member adapted to displace said workpiece in said cell toward said exit aperture.

5. Apparatus for delivering elongated gravitationally asymmetric workpieces to receptacles on a continuously moving conveyor in a predetermined orientation, said apparatus comprising a turret traversed by said conveyor, a workpiece holding tube on said turret, an orienting cell radially disposed in said turret comprising an exit aperture in alignment with a conveyor receptacle traversing said turret, means for delivering workpieces one at a time from said tube to said cell, means for displacing a workpiece in said cell radially inward toward said exit aperture, an inclined guide surface on said cell adapted to control the movement of a workpiece of a given orientation, and means comprising a fixed cam for moving such workpiece into engagement with and upwardly along said guide surface.

6. Apparatus for delivering elongated gravitationally asymmetric workpieces to receptacles on a continuously moving conveyor in a predetermined orientation, said apparatus comprising a turret traversed by said conveyor, a workpiece holding tube on said turret, an orienting cell on said turret comprising an exit aperture in alignment with a conveyor receptacle traversing said turret, means for delivering workpieces one at a time from said tube to said cell, fixed means for moving workpieces endwise through said cell toward said exit aperture, control surfaces on said cell adapted to effect uniform orientation of workpieces escaping through said exit aperture, an ejector stem on said turret, and means for actuating said stem in synchronism with the movement of a workpiece through said cell to effect the placement of said workpiece in said conveyor receptacle.

7. Apparatus for delivering elongated gravitationally asymmetric workpieces to receptacles on a continuously moving conveyor in a predetermined orientation, said apparatus comprising a turret traversed by said conveyor, a workpiece holding tube on said turret, an orienting cell on said turret comprising an exit aperture in alignment with a conveyor receptacle traversing said turret, means for delivering workpieces one at a time from said tube to said cell, fixed means for moving workpieces endwise through said cell toward said exit aperture, control surfaces on said cell adapted to effect uniform orientation of workpieces escaping through said exit apertures, an ejector stem on said turret, means for actuating said stem in synchronism with the movement of a workpiece through said cell to effect the placement of said workpiece in said conveyor receptacle, and a support on said turret for a workpiece so positioned in a conveyor receptacle.

References Cited in the file of this patent

UNITED STATES PATENTS

| Number | Name | Date |
| --- | --- | --- |
| 620,350 | McGrail | Feb. 28, 1899 |
| 1,242,086 | Von Henriquez | Oct. 2, 1917 |
| 1,282,610 | Macomber | Oct. 22, 1918 |
| 2,379,717 | Hurley | July 3, 1945 |
| 2,570,903 | Yost | Oct. 9, 1951 |